Feb. 1, 1949.   W. W. HANSEN ET AL   2,460,287
RADIATING ELECTROMAGNETIC RESONATOR
Original Filed Jan. 17, 1938
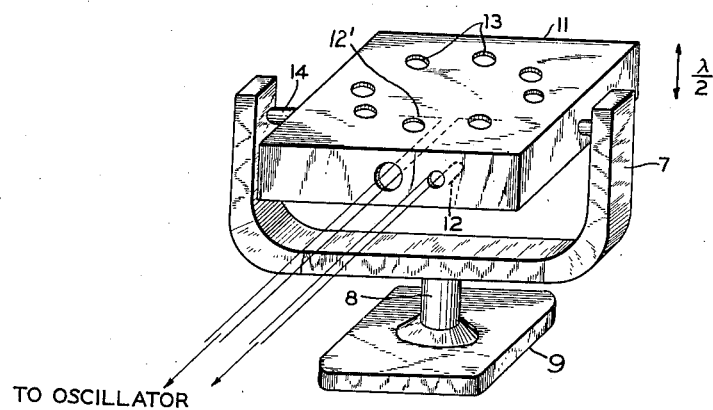
TO OSCILLATOR
INVENTORS
WILLIAM W. HANSEN
RUSSELL H. VARIAN
BY
ATTORNEY Patented Feb. 1, 1949

2,460,287

UNITED STATES PATENT OFFICE 2,460,287

RADIATING ELECTROMAGNETIC RESONATOR

William W. Hansen, Garden City, and Russell H. Varian, Wantagh, N. Y., assignors to The Board of Trustees of the Leland Stanford Junior University, Stanford University, Calif., a corporate body of California Original application January 17, 1938, Serial No. 185,382. Divided and this application November 5, 1942, Serial No. 464,614

9 Claims. (Cl. 250—33.63)

This invention relates, generally, to the projection of radio waves in the form of a beam, and the invention has reference more particularly to the use of suitably apertured hollow resonators for the accomplishment of this result above mentioned.

The principal object of this invention is to produce simple, compact, and easily portable apparatus for projecting directional radio beams, said beams being suitable, among other things, for guiding aircraft to safe landings under conditions of low or zero visibility.

Another object of the present invention is to provide means for obtaining a directive beam of electromagnetic energy of pencil or columnar shape, said beam being especially useful in connection with apparatus for measuring distances and velocities described in co-pending application Serial No. 185,382, filed January 17, 1938, which has since issued as Patent No. 2,415,094 on February 4, 1947, of which the present application is a division.

Another object of the present invention is to provide a hollow resonator having suitable radiating means or apertures disposed to produce a desired shape of beam radiation, such as columnar beams.

Still another object of the present invention is to provide means for orientating said electromagnetic wave radiation apparatus in azimuth and elevation, as for effecting scanning operation and selective reception of radiation emitted or reflected from some remote object.

Other objects and advantages will become apparent from the specification, taken in connection with the accompanying drawing illustrating an embodiment of the invention.

The single figure of the drawing is a perspective view of an embodiment of the invention capable of projecting a columnar beam of radiation.

Referring now to the single figure of the drawing showing an illustrative form of narrow columnar beam radiator, comprising a hollow resonator 11, approximately square in plan having sides of dimensions large in comparison with the wavelength corresponding to the frequency of the standing electromagnetic waves within said resonator, or a multiple thereof when said resonator is operated on a harmonic of its fundamental frequency. Resonator 11 is shown excited by means of an inductive loop 12 or di-pole 12' energized through leads shown which may be a concentric line. In one face of the resonator, apertures 13 are provided formed by circular openings of a diameter which is small compared to a wavelength consequently, the amount of wave energy translated through the apertures 13 is less in amount than the amount of wave energy incident upon the walls of the cavity 11. The apertures are distributed over an area covering several wavelengths in various directions, and may conveniently be arranged symmetrically along concentric circles. When cavity resonator 11 is excited to the fundamental mode of oscillation determined by its depth, or to a harmonic thereof when the depth is made substantially to correspond to a multiple of one-half wavelength, the electric vector of the contained field will be parallel to said face having the holes or apertures 13 therein, and the radiation emitted through the various apertures 13 will be in phase, and due to interference, the resultant radiation will be restricted to a columnar beam whose axis is perpendicular to the radiating face of the cavity resonator, and having an angular spread which is a function of the ratio of the wavelength to the dimension of the pattern formed by the radiating apertures. The beam of radiation can be orientated in both azimuth and elevation by rotating the cavity resonator 11 about trunnions 14 and about the axis of a shaft 8 attached to the yoke 7 and engaging in a step bearing in base 9. The beam may be oriented by remote control if desired. When used as a searching beam, the resonator 11 is elevated to the desired angle by inclining the axis of the resonator from the vertical. The transverse spread of the beam is centered about the line perpendicular to the face of the resonator centrally located with respect to apertures 13. The wavelengths found most useful for scanning purposes are those of the order of 1 to 10 centimeters.

What is claimed is:

1. A columnar radiator of electromagnetic energy consisting of an enclosed prismal hollow conductor having in one end face apertures of dimensions comprising but a fraction of a wavelength of the radiated electromagnetic energy, said apertures being distributed over an area greater in extent than a wavelength, and means for producing within the conductor electromagnetic waves whose electric vector is parallel to the face containing said apertures.

2. Means for radiating a directional beam of electromagnetic waves comprising a conducting body with a cavity therein, one bounding wall of which is plane, means for setting up standing electromagnetic waves within said body having wave fronts reaching all parts of the plane wall simultaneously, and means located in said plane wall for radiating a small part only of the radiation incident on said wall, said last-named means being distributed over a length of said plane wall that is long compared to a wavelength in free space of the radiation within said cavity.

3. Directional antenna means comprising a conducting body having a cavity therein adapted to resonate at a natural frequency thereof and to contain a standing oscillating electromagnetic field therein, said cavity having at least one dimension of a length considerably larger than the wavelength of said field in free space, and coupling means for coupling to the electromagnetic field within said body and having a length considerably smaller than the length of said dimension, said body being apertured over a distance large compared with a wavelength in free space of said energy to permit translation of electromagnetic energy between the interior and exterior of said body.

4. A directional antenna for electromagnetic waves comprising a substantially closed hollow conducting body having enclosing walls with long and short dimensions providing an interior resonant cavity of a length appreciably greater than its depth, and adapted to contain high frequency standing electromagnetic waves resonant at a natural frequency thereof and having an electric vector substantially parallel to the length of the cavity and to the long wall thereof, the resonant frequency of said waves being determined by the depth of said cavity, relatively small electromagnetic wave coupling means within said cavity for coupling to said waves, said cavity having a length of a greater order of magnitude than the length of said coupling means, a long wall of said body being arranged for translating electromagnetic energy between the exterior and interior of said body over an area that has at least one dimension that is long compared to the wavelength of said waves in free space, said translating area being relatively small compared to the internal wave-reflecting area within said body.

5. A high frequency directive antenna comprising a hollow conducting enclosed resonator adapted to contain oscillating standing electromagnetic waves therein resonant at a natural frequency thereof, electromagnetic wave coupling means within said resonator for coupling to said standing waves, said resonator having a dimension of length materially longer than the wavelength in free space of said waves, said coupling means being relatively short compared to the length of said dimension, said resonator being apertured along said dimension to provide an electromagnetic wave translating area for translating waves between the interior and exterior of said resonator, said area being relatively small compared to the total wave-reflecting area within said resonator.

6. Directional high frequency antenna means comprising an enclosed conducting body adapted to contain electromagnetic waves resonant at a natural frequency of said body and having a length of a higher order of magnitude than the wavelength of said waves in free space, and coupling means having a length of a considerably smaller order of magnitude than the length of said body for coupling to said waves within said body, said body having means extending for a distance long in comparison to said wavelength for translating electromagnetic energy between the interior and exterior of said body.

7. A high frequency antenna having a columnar directivity pattern consisting of a prismal hollow conductor having in one face apertures of dimensions small in comparison to a wavelength of the operating frequency, said apertures being distributed over an area greater in extent than said wavelength, and means for coupling to the component of the electromagnetic field within said conductor having electric vector parallel to the face containing said apertures.

8. Direction antenna means comprising a conducting body having a cavity therein adapted to resonate at a natural frequency thereof and to contain a standing electromagnetic field therein, electromagnetic field coupling means within said resonator for coupling to said standing field, said resonator being apertured to provide an electromagnetic wave translating area for translating high frequency waves between the interior and exterior of said resonator, said area being relatively small as compared with the wave-reflecting area of said resonator.

9. Directional antenna means comprising a conducting body having a cavity adapted to contain an oscillating electromagnetic field therein, said cavity having at least one dimension of a length considerably longer than the wavelength of said field in free space, and coupling means for electromagnetically coupling to said body, said body being apertured over a distance large compared with said wavelength to permit translation of electromagnetic energy between the interior and exterior of said body.

WILLIAM W. HANSEN.
RUSSELL H. VARIAN.

REFERENCES CITED

The following references are of record in the file of this patent:

UNITED STATES PATENTS

| Number | Name | Date |
|---|---|---|
| 1,932,469 | Leib et al. | Oct. 31, 1933 |
| 2,206,923 | Southworth | July 9, 1940 |
| 2,253,501 | Barrow | Aug. 26, 1941 |
| 2,297,202 | Dallenbach et al. | Sept. 29, 1942 |